US 7,023,468 B2

(12) United States Patent
Chikahisa et al.

(10) Patent No.: US 7,023,468 B2
(45) Date of Patent: Apr. 4, 2006

(54) PHOTO SURVEY SERVICE SYSTEM

(75) Inventors: Hiroshi Chikahisa, Tokyo (JP); Kaoru Kobayashi, Saitama (JP); Hirotaka Nakahara, Saitama (JP); Kazunobu Matsumoto, Saitama (JP); Masayuki Tsutsui, Saitama (JP); Kouki Kumagai, Saitama (JP)

(73) Assignee: Tobishima Corporation, Tokyo (JP)

( * ) Notice: Subject to any disclaimer, the term of this patent is extended or adjusted under 35 U.S.C. 154(b) by 831 days.

(21) Appl. No.: 09/861,630

(22) Filed: May 22, 2001

(65) Prior Publication Data

US 2002/0146164 A1 Oct. 10, 2002

(30) Foreign Application Priority Data

Dec. 15, 2000 (JP) .............................. 2000-381509

(51) Int. Cl.
*H04N 7/18* (2006.01)

(52) U.S. Cl. ..................................................... 348/144
(58) Field of Classification Search ................ 348/140, 348/141, 142, 143, 144, 154, 135, 164, 184, 348/294, 298, 222; 382/294, 295, 296, 293, 382/284, 100, 311, 154

See application file for complete search history.

(56) References Cited

U.S. PATENT DOCUMENTS

| | | | | |
|---|---|---|---|---|
| 4,994,971 | A * | 2/1991 | Poelstra | 701/35 |
| 5,214,281 | A * | 5/1993 | Rowe | 250/253 |
| 5,220,441 | A * | 6/1993 | Gerstenberger | 358/487 |
| 5,806,005 | A * | 9/1998 | Hull et al. | 455/566 |
| 5,818,951 | A * | 10/1998 | Schivley | 382/100 |
| 6,385,772 | B1 * | 5/2002 | Courtney | 725/105 |
| 6,392,692 | B1 * | 5/2002 | Monroe | 348/143 |
| 6,522,787 | B1 * | 2/2003 | Kumar et al. | 382/268 |
| 6,587,601 | B1 * | 7/2003 | Hsu et al. | 382/294 |

* cited by examiner

*Primary Examiner*—Vu Le
*Assistant Examiner*—Behrooz Senfi
(74) *Attorney, Agent, or Firm*—Westerman, Hattori, Daniels & Adrian, LLP

(57) ABSTRACT

The photo survey service system of the invention comprises an image information receiving means 12 for receiving image information from customer's terminal equipment 8 via a telecommunication circuit network 10, which image information is obtained by taking photographs of an area 4 under survey having a plurality of stations 2-1, 2-2, . . . 2-n from a plurality of points using a digital camera 6 at a fixed focal length, an analysis processing means 14 which uses computation processing to calculate a three-dimensional vector relation of each station from the received image information on the basis of a difference in parallax between both images of adjacent photographing points, and an analytical result transmitting means 16 for transmitting information on the calculated three-dimensional vector relation of each station to the customer's terminal equipment 8 via the telecommunication circuit network 10.

5 Claims, 18 Drawing Sheets

[Fig. 1]
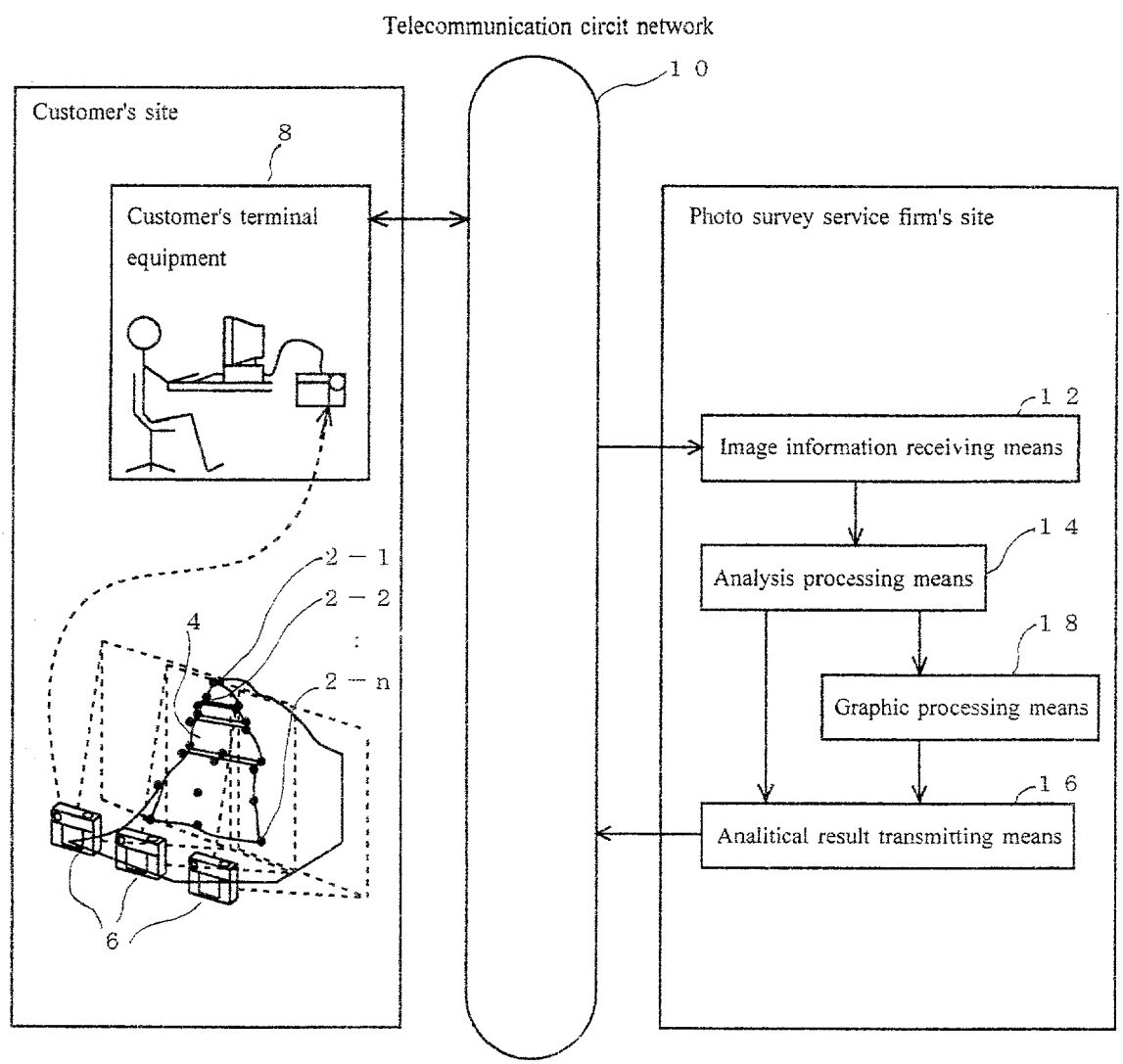

[Fig. 2]
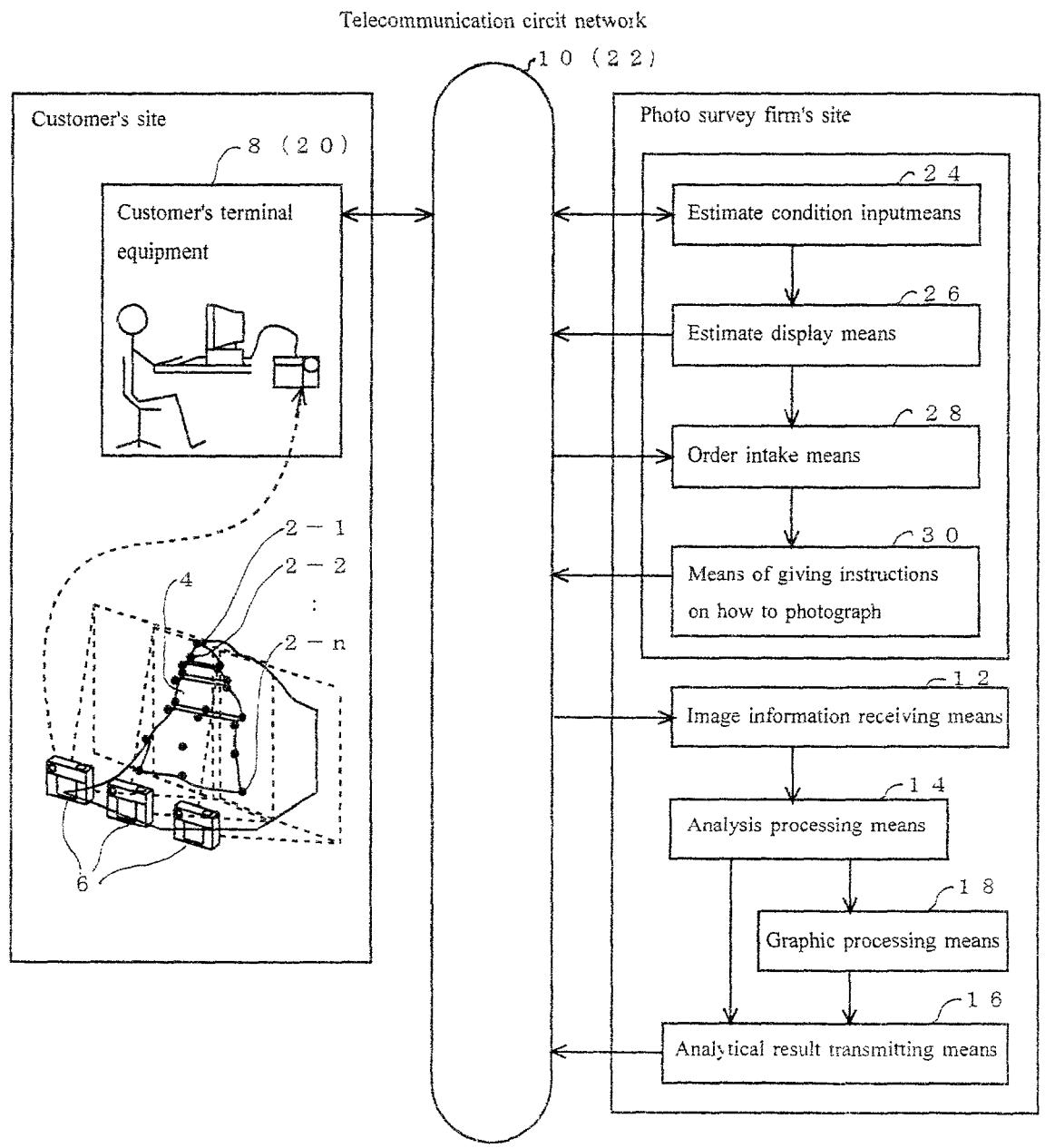

[Fig. 3]
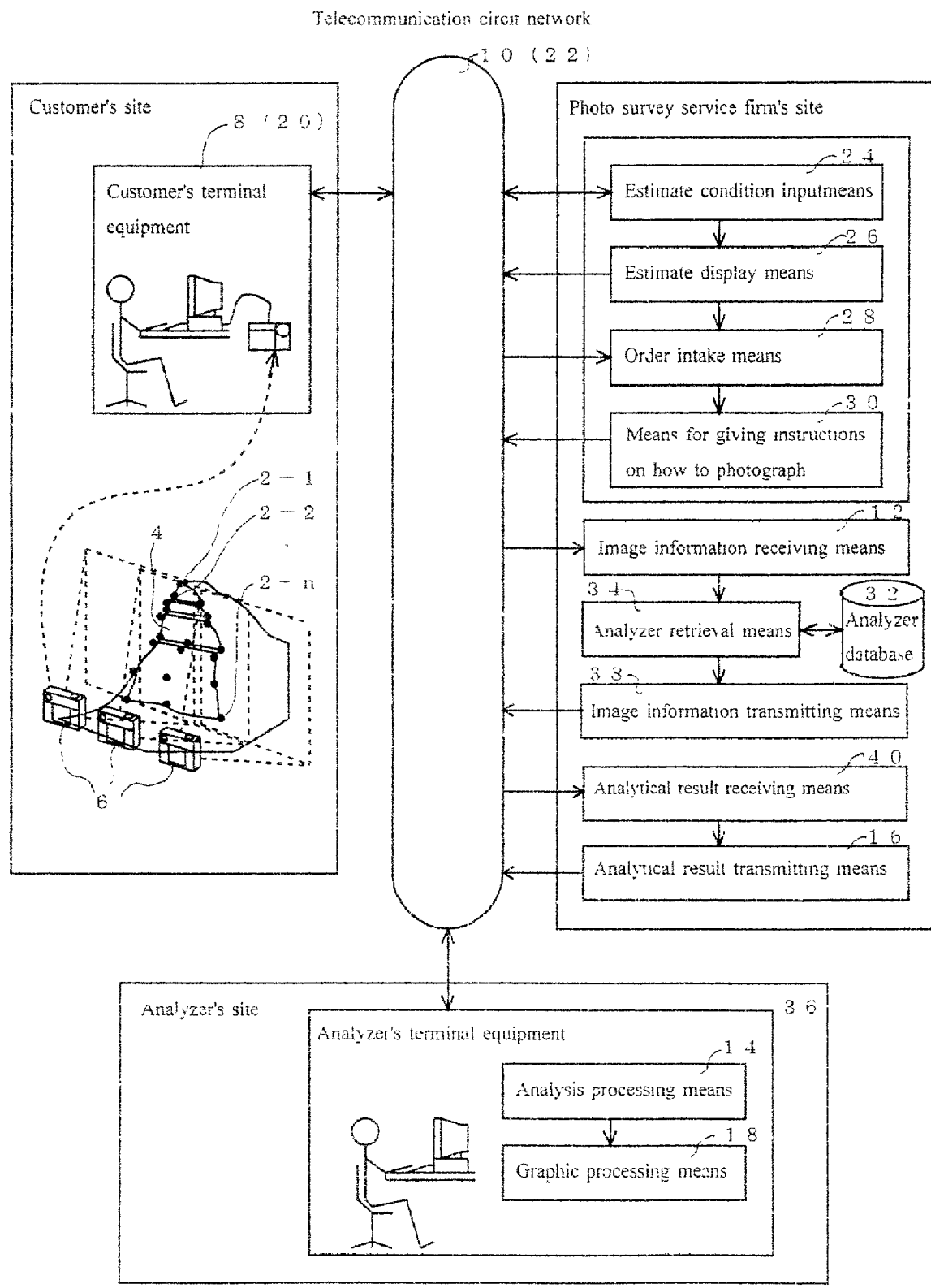

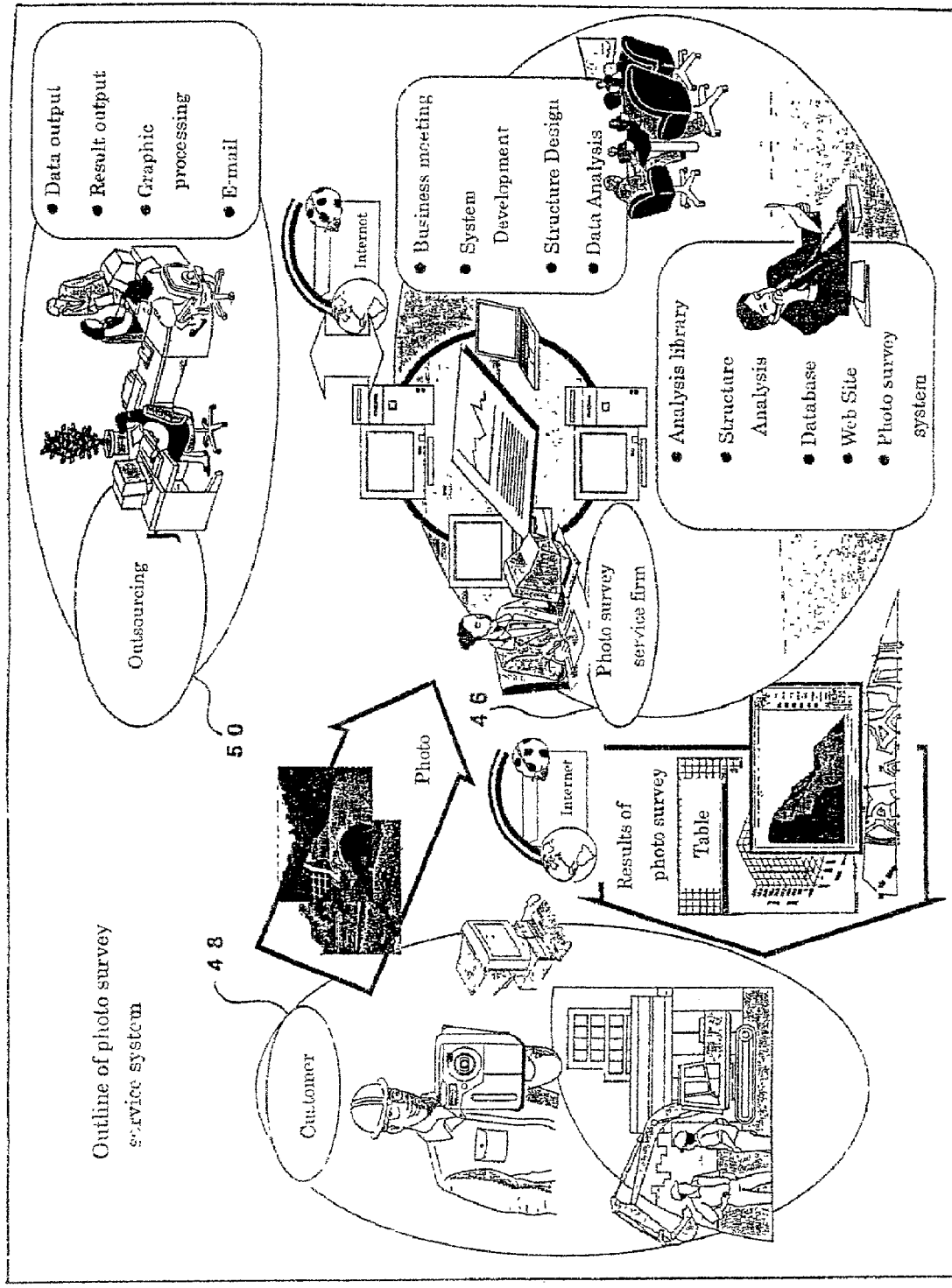

[Fig. 5]

Estimate Corner

Purchase of Analysis Software
    (Manual Input) : one package ( xxxx yen )

Request for Analysis and Drawing Operations
    (Complete the order sheet, and send it upon confirmation of estimate)

1. Number of photographs   [    ] (entered in half font size)

2. Number of survey point   [    ] (entered in half font size)
    * The calculated point is (the number of leaves × the number of survey points).

3. Output Format (Click the desired format)
    ☐ Point Information   ☐ Cont. Drawings(2-D)   ☐ CAD Drawings(3-D)

4. Desired Delivery Time (Cont. drawings and CAD drawings are separately delivered)
    ☐ Ordinaly delivery (one week from order intake)
    ☐ Express delivery (three days from order intake)
    ☐ Superexpress delivery (one day from order intake)
    * Express, and superexpress delivery is limited to customers
      requesting point information output and mail delivery 5. Photograph Delivery (Click the desired delivery)
    ☐ E-mail (together with compressed BMP file)
    ☐ Mail ( F D or M O )

6. Output Result Delivery (Click the desired delivery)
    E-mail     Mail ( F D or M O )

Estimate Price Scale

| 1. Number of Photographs | xxxxYen / Photo |
| --- | --- |
| 2. Number of Survey Points | xxxxYen / Point |
| 3. Output format | Point=Zero Yen, Cont.=xxxYen(+), CAD=xxxxYen(+) |
| 4. Desired Delivery Time | Ordinary delivery=Zero Yen, Express delivery=xxxxYen(+), Superexpress delivery=xxxYen(+) |
| Total Estimate (exclusive of consumption tax) | ****** Yen |

If you send an order, move to the next page.   [ Next Page ]

Order Corner

Fill out the following format.

- Payment Method (Click the desired method)
    ☐ Cash (in advance)    ☐ Payment on delivery (mail only)

- Transfer
    ××Bank   ××Branch   Ordinary Account×××××××

- Amount    157,500Yen (with a consumption tax of 7,500Yen)

- Necessary Document
    ☐ Estimate    ☐ Bill    ☐ Statement of Delivery

Name      [            ]  (full font)
kana      [            ]  (hiragana)
Tel Number [           ]  (half font)
Mail Number [         ]   (half font : ex.100-0000)
Address   [                      ]  (full font)
E-mail    [            ]
Miscellaneous
[                        ]

[Confirmation of transmission]   [Cancel]

Appreciate your order. Push the "confirmation of transmission", and check the transmission. If there is no mix-up, push the "transmission" button.

After confirmation of order intake, we will mail to you. When an image file is to be mailed please mail it upon receipt of contact from us. When image capacity is large please send the image in a compressed form.

[Transmission]

[Fig. 7]
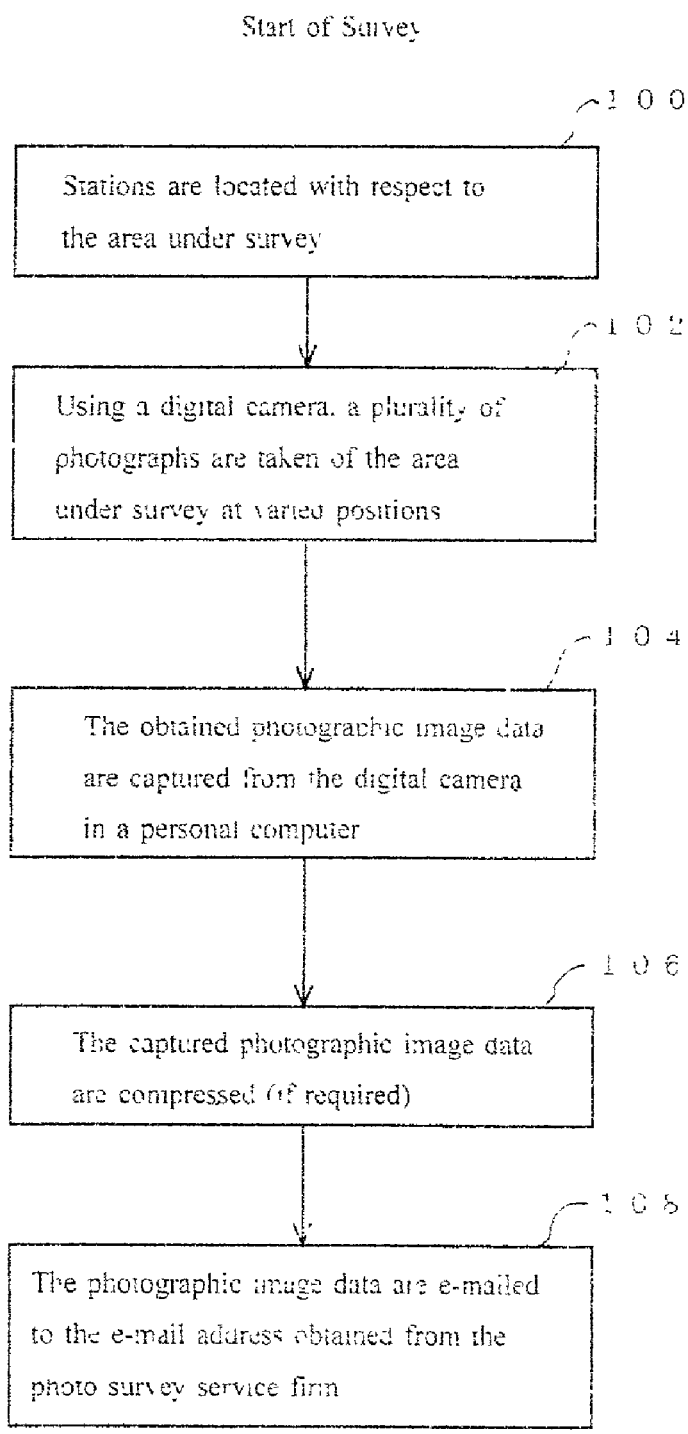

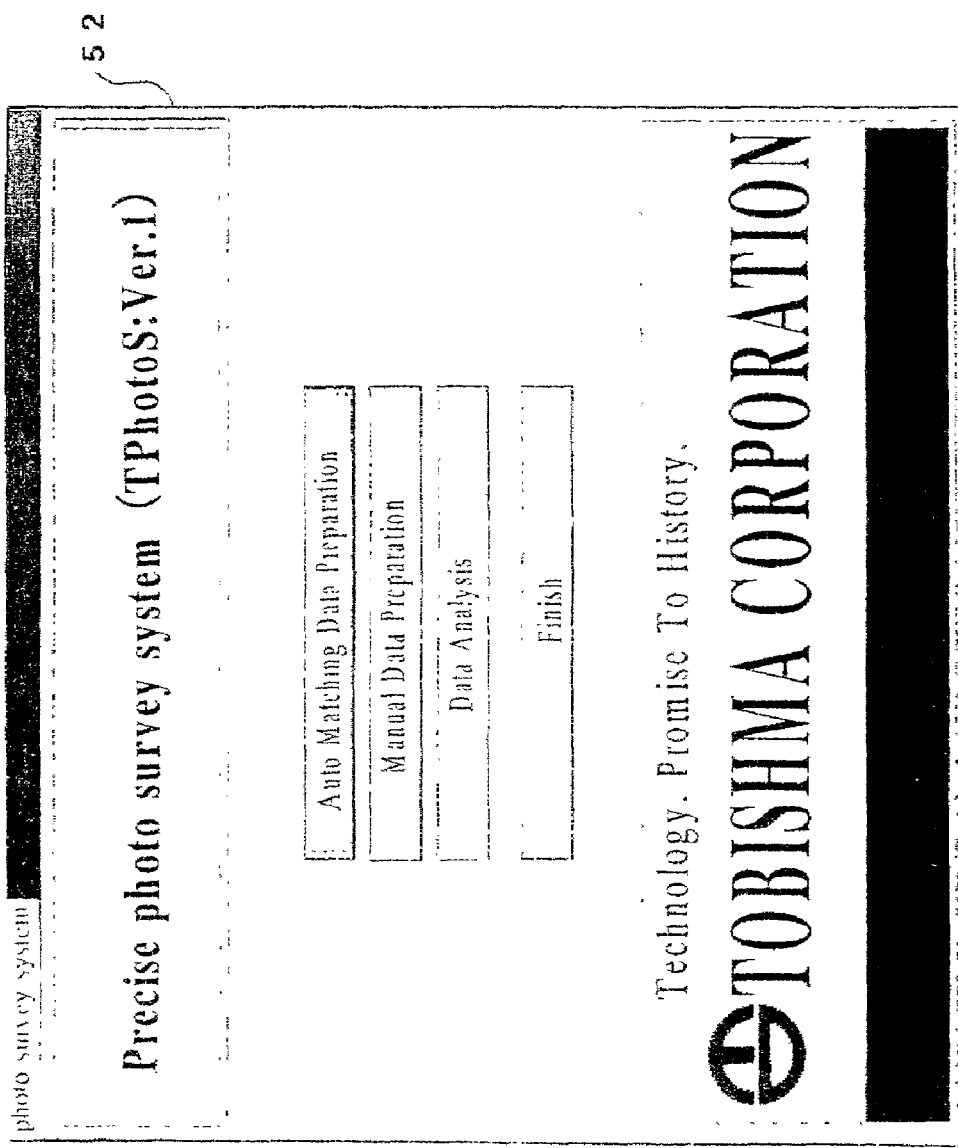
[Fig. 8]

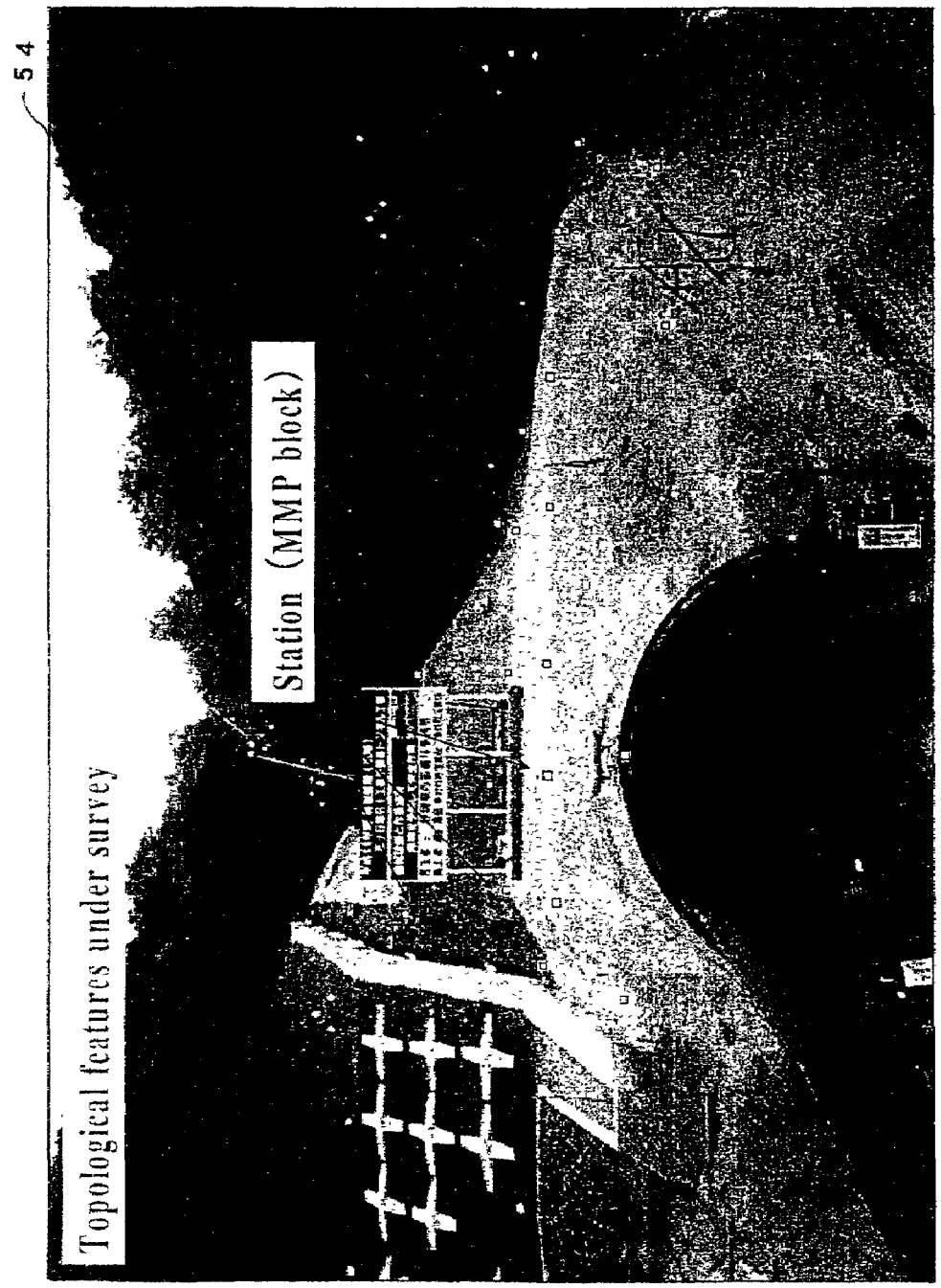

[Fig. 10]
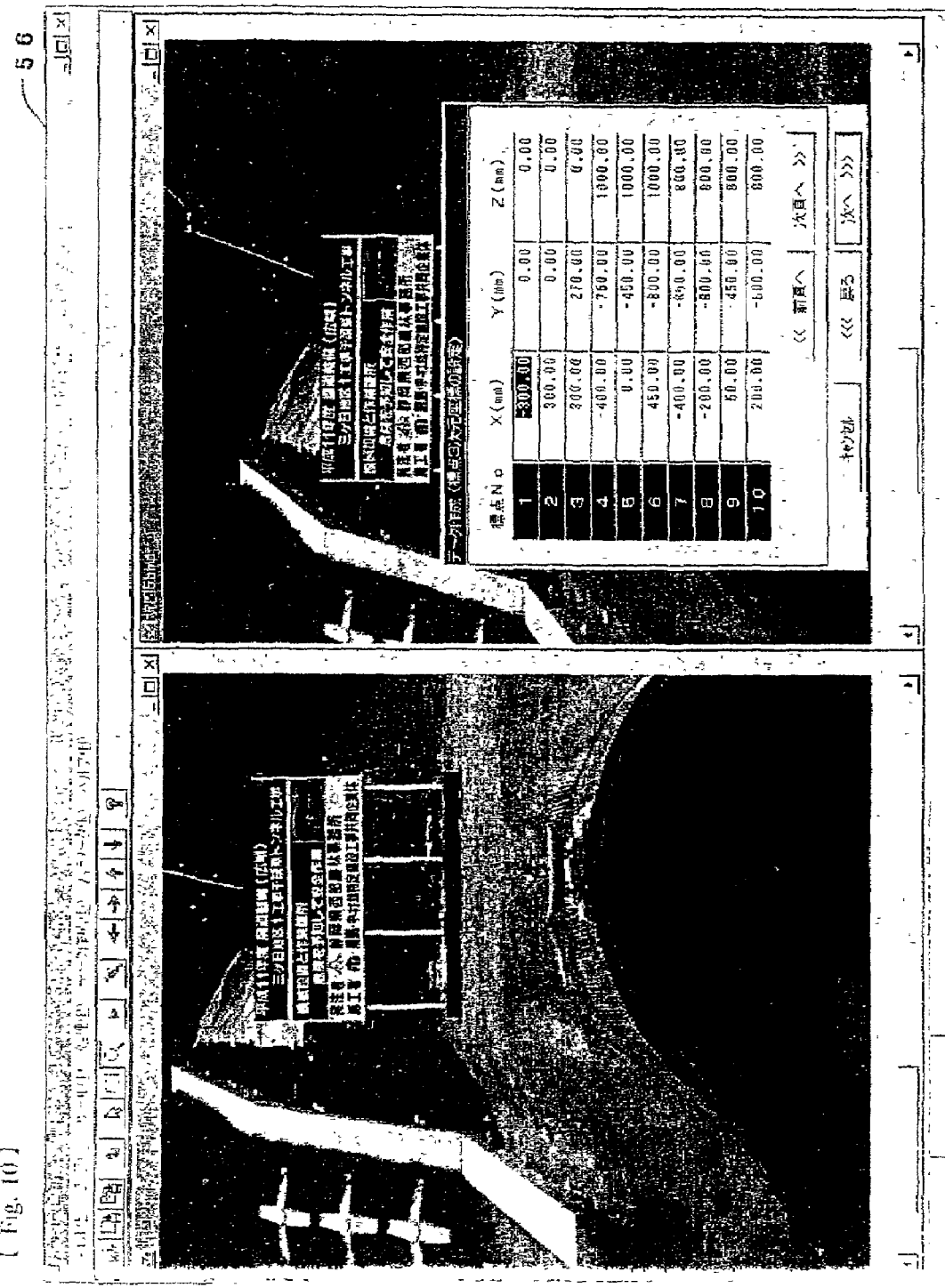

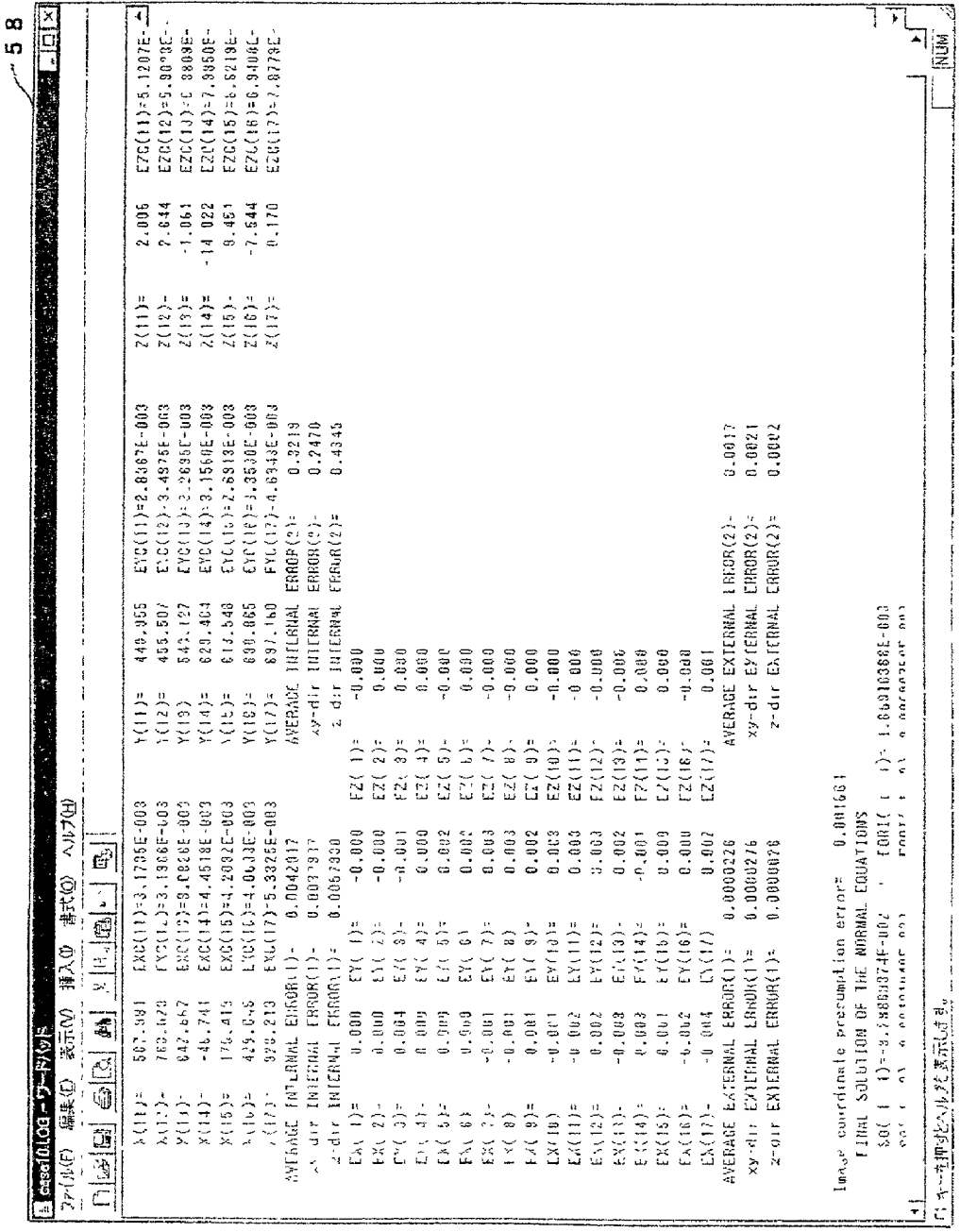
[Fig. 11]

[ Fig. 12 ]
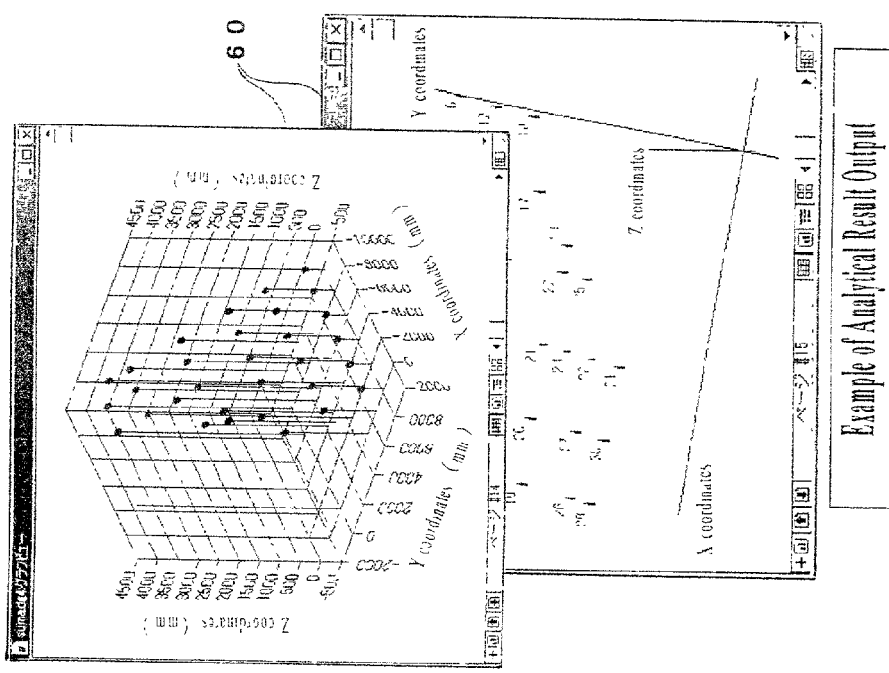

[Fig. 13]
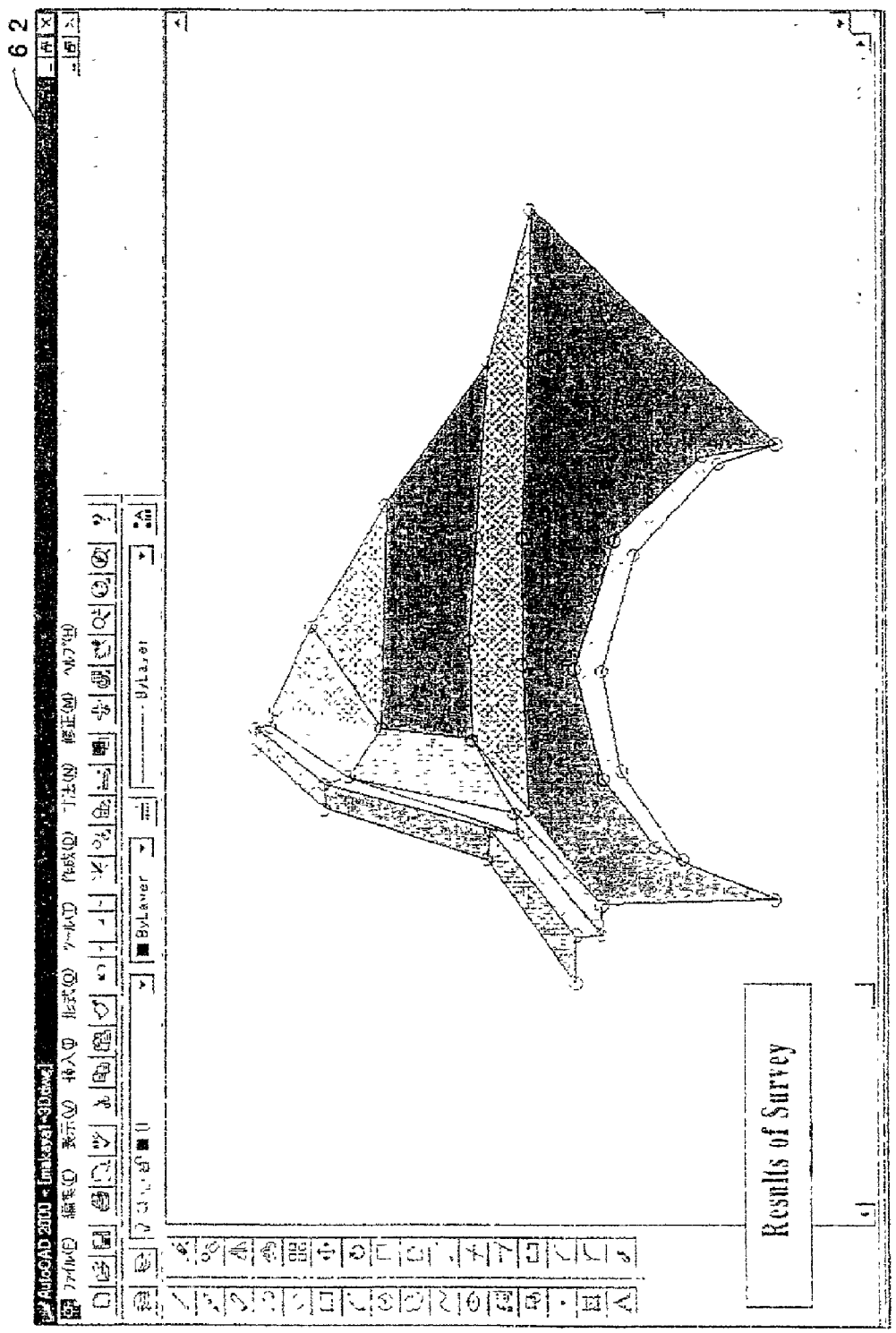

[Fig. 14]
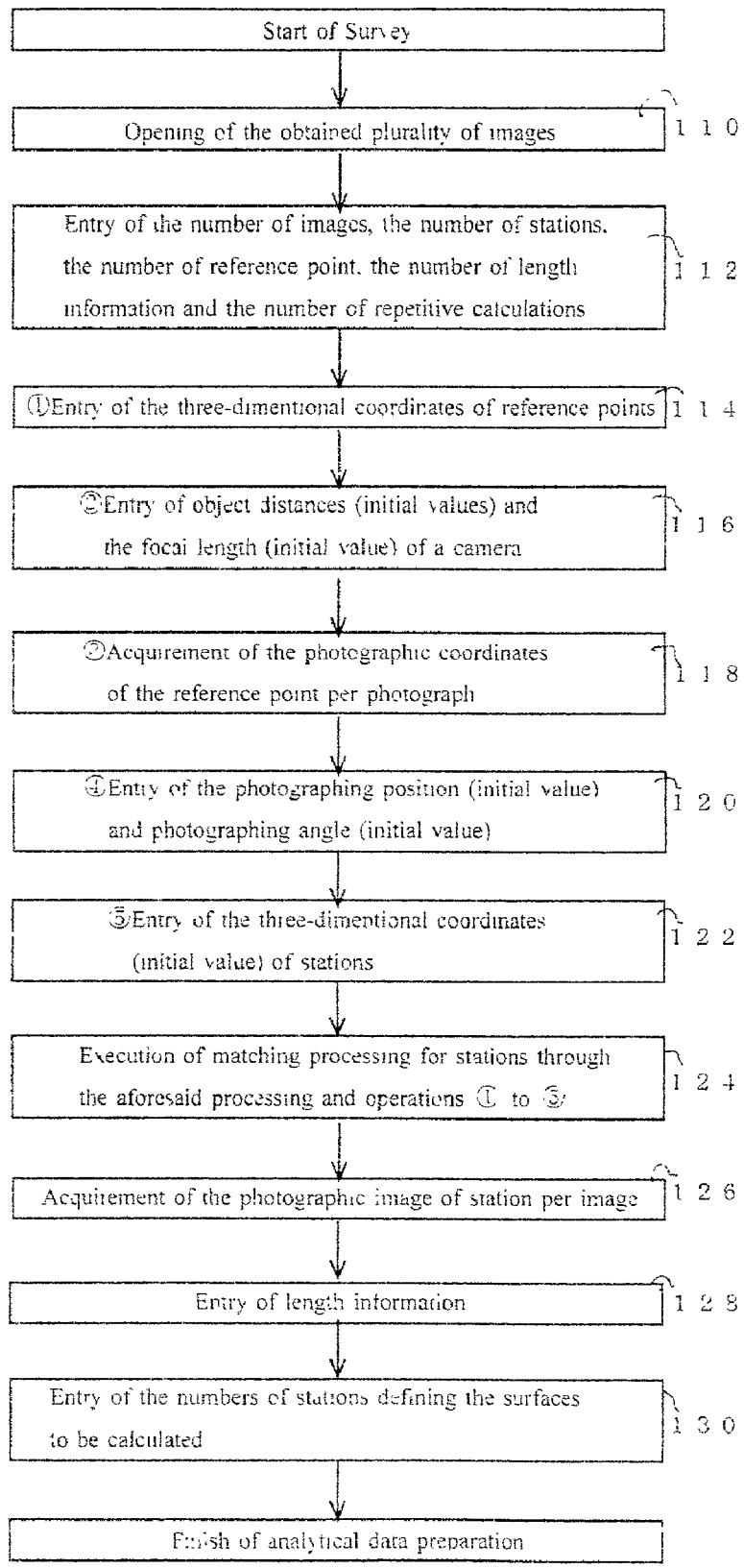

[Fig. 15]
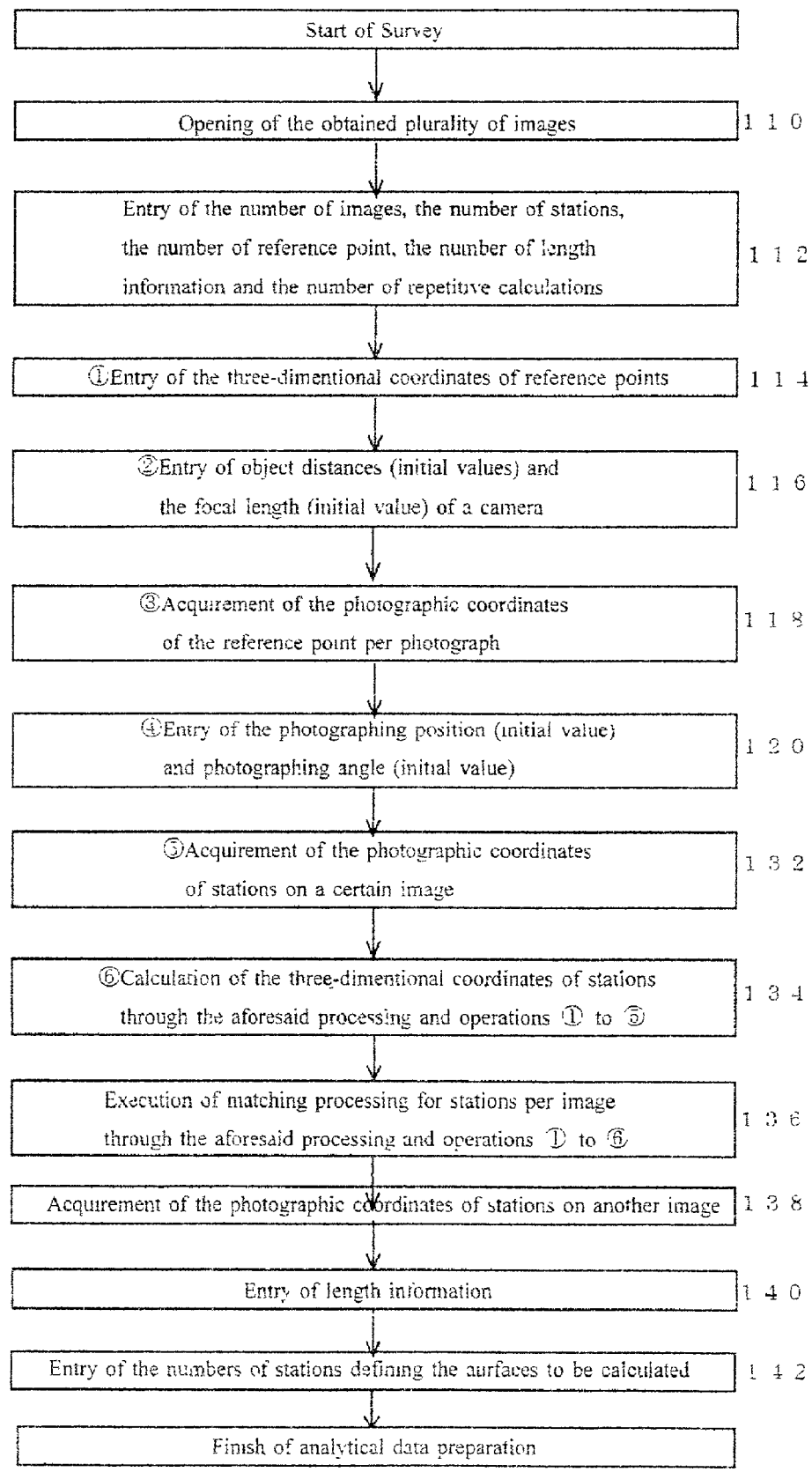

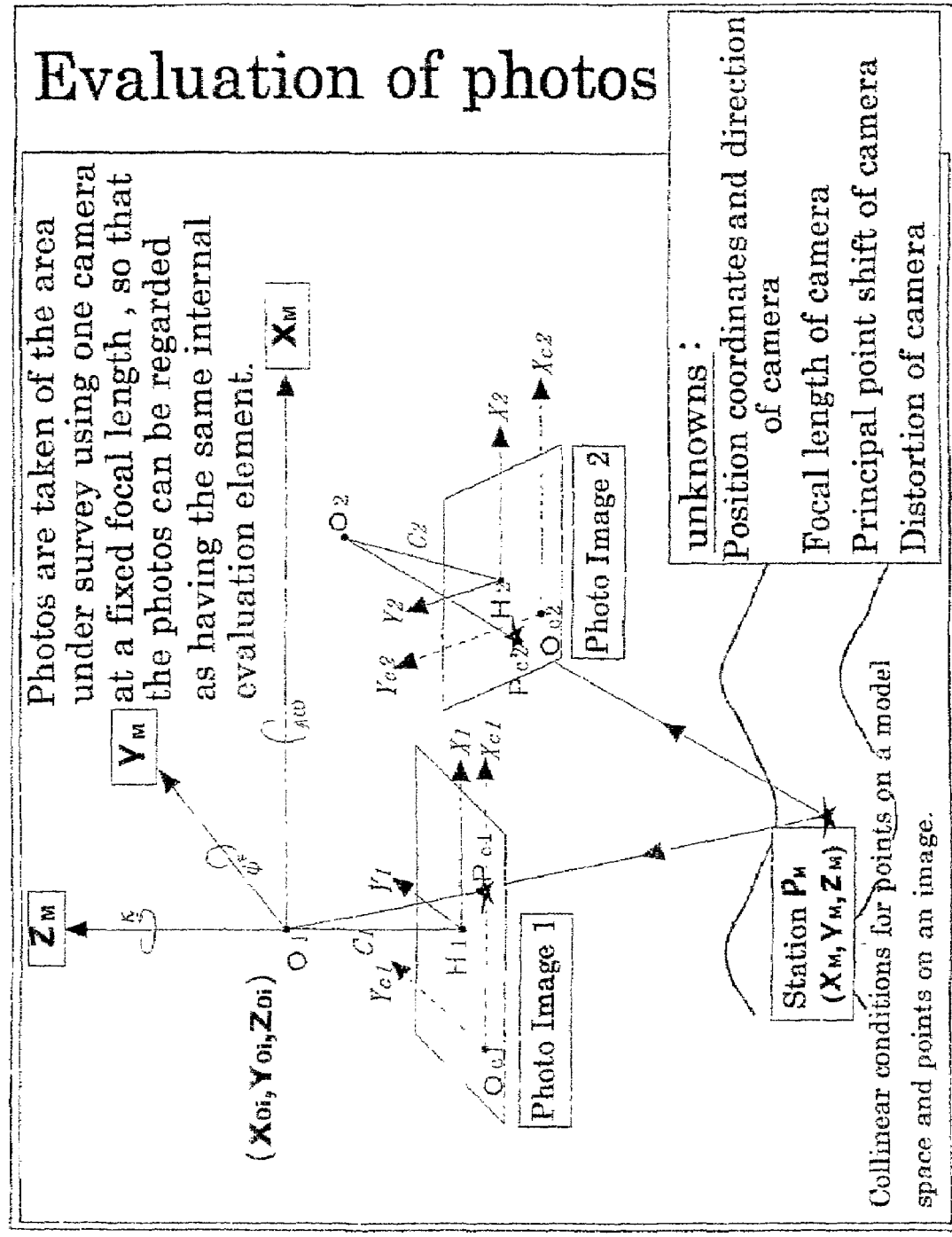
[Fig. 16]

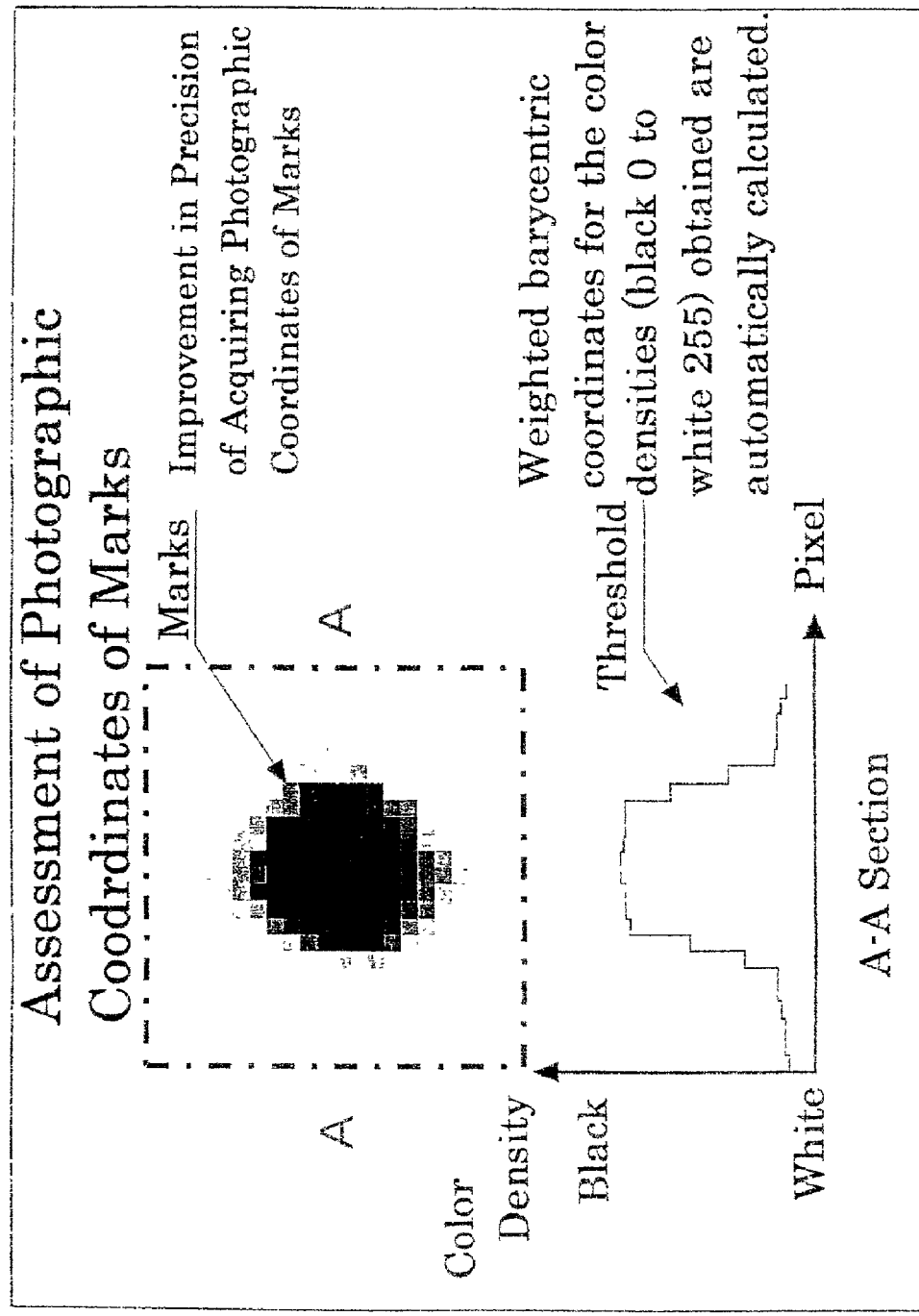

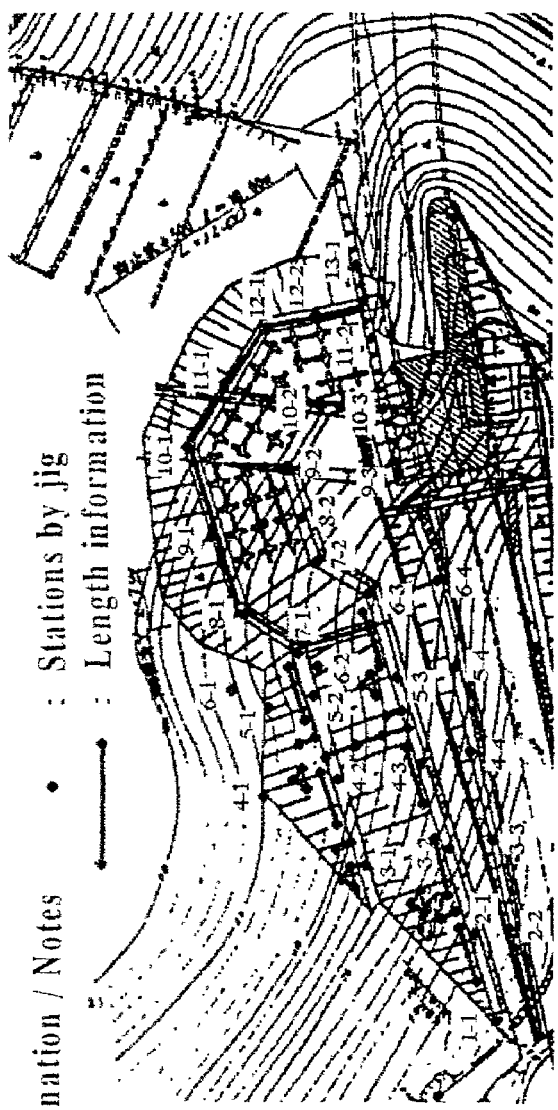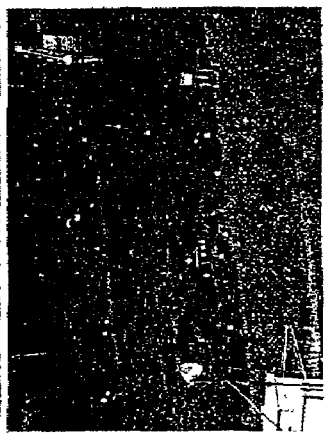
[Fig. 18]

US 7,023,468 B2

PHOTO SURVEY SERVICE SYSTEM

BACKGROUND OF THE INVENTION

The present invention relates to a photo survey service system applicable to surveys and measurements in civil engineering, construction and other fields.

PRIOR ART

For surveys in civil engineering, construction and other fields, aerial photo surveying and TS surveys have been generally used so far in the art. In the aerial photo surveying, the area under survey is photographed from an aircraft so that photographs can be evaluated or subjected to graphic processing to obtain the results of photo surveying, and in the TS survey, the land under survey is surveyed by a TS (total station: survey equipment having combined functions of measuring angles (e.g., a transit) and distances (e.g., an optical distance measuring meter). In recent years, surveys using GPS receivers or electronic reference points have been available.

However, a problem with the aforesaid TS survey is that a surveyor registered or a person having a high degree of expertise must go to the area to be surveyed. A problem with survey equipment such as TS is that it is generally expensive and often very hard to handle. For handling such TS equipment, a surveyor registered or a person having a high degree of expertise is needed.

Problems with the aerial photo surveying are that high-definition cameras must be used, aerophotography is largely dependent on weather conditions, and much cost is needed even for one photo surveying flight.

In conventional surveys, therefore, survey operations are now outsourced to a survey firm having expert knowledge to perform a series of operations from a survey at an area including the land to be surveyed to graphic processing.

For a certain survey, the survey firm must take a series of administrative work such as planning, setups, movement to the area to be surveyed, area investigations, point selection, determination of stations, observations, movement to the office, calculations, data collations, etc.

For this reason, the survey cost that the survey firm demands a client is very high. Since much administrative work is needed for survey purposes as mentioned above, a number of days are needed until the client can make use of the results of photo surveying after the order has been received by the firm.

The cost of survey equipment, the number of survey workers who must go to the lands to be surveyed, survey operations, etc. put heavy burdens on the survey firm. On the other hand, competition between survey firms heats up and so much business expenses are needed for receiving orders for survey operations. Furthermore in conventional survey methods, it is necessary to locate stations at the area or land to be surveyed. This often becomes a detriment to the following works or forces survey workers to step in dangerous zones.

In addition, when certain survey precision is not obtained because of survey work mix-ups, field note mix-ups, etc., nearly all survey works must be redone.

SUMMARY OF THE INVENTION

In view of such problems as mentioned above, it is an object of the present invention to provide a photo survey service system in which hardware and methodology much simpler for both a client and a survey firm than ever before can be achieved to obtain survey results on shorter lead times yet at much lower costs, viz., the results of three-dimensional vector and position analyses.

Embodiments of the photo survey service system of the present invention are illustrated in FIGS. 1 to 3.

According to the first aspect of the invention shown in FIG. 1, there is provided a photo survey service system comprising:

an image information receiving means 12 for receiving image information from customer's terminal equipment 8 via a telecommunication circuit network 10, said image information being obtained by taking photographs of an area 4 under survey having a plurality of stations 2-1, 2-2, ... 2-n from a plurality of points using a digital camera 6 at a fixed focal length, an analysis processing means 14 which uses computation processing to calculate a three-dimensional vector relation of each station from the received image information on the basis of a difference in parallax between both images of adjacent photographing points, and an analytical result transmitting means 16 for transmitting information on the calculated three-dimensional vector relation of each station to the customer's terminal equipment 8 via the telecommunication circuit network 10.

According to the second aspect of the invention, there is provided a photo survey service system comprising:

an image information receiving means 12 for receiving image information obtained by taking photographs of an area 4 under survey having a plurality of stations 2-1, 2-2, ... 2-n from a plurality of points using a digital camera 6 at a fixed focal length and length information in the area 4 under survey from customer's terminal equipment 8 via a telecommunication circuit network 10, an analysis processing means 14 which uses computation processing to calculate a three-dimensional position of each station from the received image information and the received length information in the area 4 under survey on the basis of a difference in parallax between both images of adjacent photographing points, and an analytical result transmitting means 16 for transmitting information on the calculated three-dimensional position of each station to the customer's terminal equipment 8 via the telecommunication circuit network 10.

The photo survey service system according to the first or second aspect further includes a graphic processing means 18 for performing graphic processing on the basis of information concerning the three-dimensional vector relation or position of each station calculated by said analysis processing means 14. In this system, said analytical result transmitting means 16 is operable to transmit, in addition to the information concerning the calculated three-dimensional vector relation or position of each station, graphic information obtained from said graphic processing means to the customer's terminal equipment 8 via the telecommunication circuit network 10.

The photo survey service system according to any one of the first to third aspects of the invention further includes:

an estimate condition input means 24 for receiving entry of at least information concerning the number of photographs and the total number of stations that are conditions for photo surveying and an output form of photo survey results from terminal equipment 20 for a person or customer gaining access to a generally browsable web site on the Internet 22, an estimate display means 26 for calculating an estimate for photo surveying on the basis of the entered conditions and displaying said estimate on a browsable screen of the terminal equipment 20 for said access person, an order intake means 28 for receiving, in a screen, entry of information for identification of said access person including her or his e-mail address and information for confirmation of an order, and for receiving an order under the entered conditions upon entry of said information by the terminal equipment 20 for said access person via the Internet 22, and a means 30 for instructing how to photograph whereby, when said order is received, a text file containing information about how to take survey photographs under said entered conditions is e-mailed to the terminal equipment 20 on the access person side via the Internet 22.

The photo survey service system according to any one of the first to fourth aspects of the invention comprises, in addition to said analysis processing means 14 or said analysis processing means 14 and said graphic processing means 18, an analyzer data base 32 wherein e-mail addresses of analyzers having the necessary analyzing expertise and information concerning their analyzing capabilities are registered, an analyzer retrieval means 34 for performing matching for the photographing conditions for an image received by said image information receiving means 12 and the information concerning the analyzing capabilities registered in said data base 32 to find the best analyzer from said data base 32, an analytical result transmitting means 34 for e-mailing the image information received by said image information receiving means 12 to terminal equipment 34 for the thus found analyzer via the Internet 22, and an analytical result receiving means 40 for receiving, in addition to information on the three-dimensional vector relation and/or position of each station calculated by the analysis processing means 14 on the thus found analyzer side, graphic information subjected to graphic processing by said graphic processing means 18 from the terminal equipment 36 on the thus found analyzer side via the Internet 22.

According to the first aspect of the invention, the system receives image information, etc. obtained by taking photographs of the area 4 under survey having a plurality of stations 2-1, 2-2, . . . 2-n from a plurality of points using the digital camera 6 at a fixed focal length from the customer's terminal equipment 8 via the telecommunication circuit network 10. Then, the system uses computation processing to calculate the three-dimensional position, etc. of each station in the area 4 from the received image information, etc. and, on customer's demand, to use the information on the thus calculated three-dimensional position to subject the area 4 to graphic processing. Finally, these results are transmitted to the customer's terminal equipment 8 via the telecommunication circuit network 10.

According to this photo survey service system, it is possible for the customer to obtain the end outcome of photogrammetry through simple arrangements on short lead times yet at low costs. What should be carried out for this purpose on the customer side is only to take photographs of the area to be surveyed using a commercially available digital camera, etc. and send them to the photo survey service firm by means of e-mail, etc. on the Internet. Then, the photo survey service firm may use its own analyzing computer to analyze the photographic data, thereby obtaining the end outcome of photogrammetry or the results of analyzing the surveyed area in the form of numerical data or three-dimensional CAD views or the like. Finally, the photo survey service firm e-mails or otherwise delivers such data or views to the customer via the Internet.

If a photo survey service firm or the like adopts the system of the invention, it is then unnecessary to buy costly survey equipment, employ additional surveyors, and pay extra expenses for sending off survey workers to the area to be surveyed. For the survey service firm, accordingly, it is possible to deliver the outcome of surveying to the customer with much reduced administrative work, on shorter lead times yet at lower costs, and so it is possible to extend an effective repetition type business mainly involving analyzing service.

Alternatively, the system of the invention may be designed such that the conditions for photo surveying are entered by a person gaining access to a firm's generally browsable wet site on the Internet 22 from person's terminal equipment 20. On the basis of these conditions, the system calculates an estimate for photo surveying costs and displays the estimate on the screen of the person's terminal equipment 20. The system further allows a customer wishing to send an order to enter information for identification of the customer and information for confirmation of the order in the system from customer's terminal equipment, thereby receiving the order under the entered conditions. Finally, the system e-mails a text file containing information about how to take survey photographs under said entered conditions is e-mailed to the terminal equipment 20 on the access person side via the Internet 22.

For the customer, it is thus possible to use her or his Internet terminal equipment such as a personal computer so that the customer can easily obtain an estimate for photo survey service and send an order. For how to obtain survey photographs under the order conditions, too, the customer can obtain specific instructions by means of e-mail or the like.

For the photo survey service firm or the like, too, it is possible to make an estimation, receive an order and give directions about surveying to the customer via the wet site on the Internet, and so it is possible to dispense with business personnel and cut back on fixed costs. For this reason, an engineering team comprising surveyors can focus energy on the development of a next-generation system.

Still alternatively, the system of the invention may be designed such that matching is performed for data in the analyzer data base 32 wherein data about analyzers having the installation and expertise necessary for analyses are registered and data about photographing conditions to find out the best analyzer. Then, the system e-mails the received image information to the found analyzer via the Internet 22, so that the information can be analyzed at the analyzer's own site. Finally, the system receives the results by means of e-mail or the like on the Internet 22 and transfers them to the customer. Thus, analytical operations can be outsourced to a proper analyzer so that analysis capabilities and analyzers consistent with demands can be ensured.

BRIEF DESCRIPTION OF THE DRAWINGS

FIG. 1 is illustrative of one embodiment of the invention.

FIG. 2 is illustrative of another embodiment of the invention.

FIG. 3 is illustrative of yet another embodiment of the invention.

FIG. 4 is a conceptual view of the photo survey service system according to the invention.

FIG. 5 is illustrative of an example of the screen of an estimate web site.

FIG. 6 is illustrative of an example of the screen of an order web site.

FIG. 7 is a flowchart of one photographic process.

FIG. 8 is illustrative of the first example of an analyzing screen.

FIG. 9 is illustrative of the second example of the analyzing screen.

FIG. 10 is illustrative of the third example of an analyzing screen.

FIG. 11 is illustrative of the fourth example of the analyzing screen.

FIG. 12 is illustrative of the fifth example of an analyzing screen.

FIG. 13 is illustrative of the sixth example of the analyzing screen.

FIG. 14 is the first flowchart of an analytical process.

FIG. 15 is the second flowchart of the analytical process.

FIG. 16 is illustrative of how to evaluate photographs.

FIG. 17 is illustrative of determining photographic coordinates.

FIG. 18 is illustrative of how to locate stations and the obtained images.

EMBODIMENTS OF THE INVENTION

One embodiment of the photo survey service system of the invention is now explained.

FIG. 4 is a schematic representation of one embodiment of the photo survey service system of the invention. According to this system, on a web site already available on the Internet a photo survey service firm 46 receives from a customer 48 an order for photo surveying, and then receives a plurality of digital photographic images obtained at varied positions in the form of a file attached to e-mail via the Internet. Main components of the present system are built within the site of the photo survey service firm 46, so that a plurality of photographic images received via the Internet are analyzed using an analyzing computer such as a personal computer. An analysis is effected to compute the three-dimensional coordinates of the area to be surveyed on the basis of a difference in parallax between a plurality of photographic images. In this analyzing system, the corresponding stations are extracted by image processing from a plurality of photographic image data obtained by means of the digital camera, so that the photographs are evaluated or analyzed by computation processing. While it is possible for the photo survey service firm 45 to effect image processing and analyses by in-house analyzing computers, it is understood that the data to be analyzed, the results of analyses, etc. in an e-mail form may be sent to an analyzer 50 via the Internet to outsource data processing, graphic processing, image processing of the analytical results and analytical processing. Then, the results of image processing and computation processing effected by an analyzing computer, i.e., the table indicative of the three-dimensional coordinates of each station at the area under survey, data such as CAD views of the area under survey are sent from the in-house Internet terminal to terminal equipment on the customer 48 side. In other words, the results of photo surveying are delivered to the customer. Accordingly, the customer making use of the photo survey service system according to this embodiment can perform, in an expedited manner and at low costs, measurement of the amount of displacements on the area under survey, monitoring of varying normal planes, preparation of a topographic map of the area under survey, etc.

Details of the system according to this embodiment are now explained.

A customer who requires to obtain the results of an analysis of the area under survey, for instance, a civil engineering or construction firm, uses an in-house PC terminal or the like to gain access to a photo survey service firm's generally browsable web site already available on the Internet. Then, the customer enters the conditions for photo surveying on the web site to obtain estimate information so that, on the basis thereof, the customer can send an order to the service firm.

More specifically, the customer gains access to a photo survey service firm's estimate web site 42, as shown in FIG. 5, on which the customer can make the necessary selection regarding the number of photographs, the number of stations (points under survey), output formats, the desired delivery date, how to send or receive the data, etc. and enter them. An HTML program of the estimate web site 42 is macroprogrammed or otherwise programmed so that on the basis of the conditions selected and entered by the customer's terminal equipment, an estimated cost can be automatically calculated and the results of this calculation are displayed on the web site 42 in the form of the "estimated sum". When the customer wants to send an order according to the on-site quotations or the like, the customer chooses the "next page" column on the lowermost column on the estimate web side 42.

This allows the customer's terminal equipment to have access to a photo survey service firm's order-receiving web site 44, as shown in FIG. 6. Then, the customer enters on the order-receiving web site 44 information regarding payment methods (with bank account number and the amount to be deposited being displayed), the necessary papers and the customer's address, name, where to make contact and e-mail address, etc. Upon checking the content of the information entered, the customer clicks the "transmission" button". Then, the information entered from the customer's terminal equipment is received at a server on the photo survey service firm side via the Internet, so that the order can be automatically received by an order control computer system. Upon completion of order intake on the photo survey service firm side, the photo survey service firm uses the entered customer's e-mail address to send to the customer messages concerning confirmation of order intake, an e-mail address to which digital photographic images are to be sent, instructions of how to obtain digital photographs and what attention is paid to photographing, etc.

In accordance with the instructions sent by e-mail to the customer regarding how to take photographs and what attention is paid to photography, the customer goes out to an area including the land to be surveyed to take digital photographs of that area. As shown in FIG. 7, the customer first locates stations (the points to be surveyed) at the area under survey (step 100). If, in this case, landmarks are disposed at the stations, the stations can then be automatically extracted in association with later image processing. Alternatively, the stations may be manually extracted at the time of analysis without recourse to any special targets. When the three-dimensional coordinates of each station at the area under survey is needed, it is preferable to take a photograph of the station together with an object of known length, thereby obtaining length information. For the object of known length, for instance, a pole, a surveying measure or a surveying mark of specific shape and known length may be used. When no three-dimensional coordinates are needed for the area to be surveyed or when the spatial orientation relation (vector) of each station is needed, there is no need of using such marks. Then, the customer uses a commercially available digital camera to take digital photographs of the area under survey at varied positions with the focus of the lens fixed at infinity (step 102). Upon completion of photographing at that area, the customer uses a USB or CF card to capture data included in the digital photographs in an Internet terminal personal computer (step 104). If required, the image date captured in the personal computer may be compressed (step 106).

Next, the customer uses the aforesaid e-mail address, which has already been given to the customer and to which the digital photographs are to be sent, to transmit e-mail to that address together with an image data file including the digital photographs captured in the personal computer (step 108). The e-mail may additionally contain length information and other information necessary for the desired analysis in its text or in the form of an attached file.

Upon receipt of the e-mail together with the digital photographic images to be analyzed via the Internet, the photo survey service firm uses an analyzing computer to carry out an analysis of the three-dimensional position of the area under survey, etc. The analysis of the three-dimensional position of each station is now explained.

Referring to FIGS. 8 to 13, there are illustrated exemplary analyzing screens on the analyzing computer. First, an operator boots up a photo survey system software installed in the analyzing computer to load in the system the photographic image file for the geographic features to be surveyed (see FIG. 8, geographic features 54), which has been sent from the customer, according to a command selected from a menu screen (see FIG. 9, a menu screen 52). For each photographic image, the operator carries out image processing or manual operation to prepare data about each station at the area under survey (see FIG. 10, a screen 56 on which analyzing input data are prepared), and performs computation processing to obtain the three-dimensional coordinate information on each station in the form of numerical data (see FIG. 11, a screen 58 indicating the analytical results). In accordance with the customer's order, the operator uses the numerical data to prepare a three-dimensional or stereoscopic coordinate view or CAD view by computation processing (graphic processing) (see FIG. 12, a screen 60 with the analytical results displayed thereon, and FIG. 13, a screen 62 with the results of photo surveying displayed thereon).

As shown in FIG. 14, the file containing a plurality of photographic images already sent from the customer is read and opened in the analyzing computer by an operator on the computer terminal equipment side (step 110).

Then, the operator enters in the computer various conditions such as unknowns, viz., the number of images, the number of stations, the number of reference points, the number of length information, the number of repetitive calculations, etc., so that the computer can prepare a plurality of conditions for computation processing (step 112).

Next, the operator enters in the computer a reference point in a three-dimensional space in which the area under survey exists, viz., the coordinates of the reference point (step 114). For instance, this reference point may be appropriately determined by allowing the customer to indicate a specific station.

Then, the operator enters in the computer an object distance (initial value) and the focal length of the camera (initial value) (step 116).

Then, the operator performs image processing, manual operations or the like to obtain a two-dimensional coordinate position on each photographic image with respect to the reference point in each of the aforesaid plurality of photographic images (step 118).

The operator enters the photographing position (initial value) and the photographing angle (initial value) in the computer (step 120), and subsequently enters the three-dimensional coordinates of each station (initial value) therein (step 122). Thus, the foregoing operations (step 114 through step 122) are carried out so that matching for the station on each image can be executed by computation processing (step 124). This in turn enables the station at the area under survey to be extracted by image processing, etc. from each photographic image and matching for associated stations between the photographic images to be performed by computation processing, so that the three-dimensional position information on each station, viz., the coordinate value of each station on the basis of any point and direction in the space under survey can be calculated. To prepare a CAD view for instance, the direction (direction vector) of a surface defined by three or more adjacent stations is calculated.

Then, the photographic image for the station per image is obtained by image processing or the like (step 126). Subsequently, the length information within the space under survey is entered by the operator in the computer (step 128). The numbers of the stations defining the surface to be calculated are finally entered in the computer (step 130).

Through the foregoing series of operations (step 114 through step 130), the direction (direction vector) of the surface defined by three or more adjacent stations is calculated so that, for instance, CAD views can be prepared.

By the term "initial value" entered for the aforesaid series of operations and processing is intended an initial value for repetitive analysis calculations, and so this initial value may be a rough value. The aforesaid series of operations make it possible to automate the operations for performing matching for station per image and obtaining photographic coordinates, which have so far be manually carried out by an operator.

Referring to the items entered by the operator for the aforesaid series of operations and processing, it is acceptable to allow the customer to prepare a text file or the like where input values are set out in the predetermined order and send the photographic images therewith to the photo survey service firm so that they can be loaded in the in-house computer. The analytical conditions entered by the customer in accordance with the photo survey service firm's estimate or order screen may also be stored in the form of file data so that they can be used at some future time.

In the present invention, the latter part of the aforesaid series of operations and processing, viz., the step 122 for entry of the three-dimensional coordinates of each station to the step 130 may be carried out according to such a process as shown in FIG. 15. To be more specific, the photographic coordinates of a station on a certain image is obtained by image processing (step 132), the three-dimensional coordinates (initial value) of the station are calculated by computation processing (step 134) to perform station matching per image (step 136), and the two-dimensional coordinate position on the photograph of each station in other images is obtained by image processing or the like (step 138). Then, the length information within the space under survey is entered by the operator (step 140), followed by entry of the numbers of stations defining the surface to be calculated (step 142). With such a process, too, similar analytical results as in the FIG. 14 process can be obtained.

The analytical principles of the present embodiment of the invention are now explained. In the system according to this embodiment, the computation and calculation processing for image processing, analytical processing, etc. is carried out on an analyzing personal computer and an analyzing application software.

FIG. 16 is illustrative of how to evaluate photographs. To derive the three-dimensional position of a station on a model space or object from a plurality of photographs, it is required to formulate collinear conditions with respect to points on the model space and points on an image. As unknowns in this case, the position coordinates and direction of a camera, the focal length of the camera, the principal point shift of the camera, the distortions of the camera, etc. should be taken into account. For the evaluation of survey photographs, photographs taken using one camera with its focal length fixed may all be regarded as having the same internal evaluation element.

When a survey camera used for conventional photo surveying is used in the present invention, the following collinear conditions are derived from projection relations from the three-dimensional coordinates (X, Y, Z) of a subject space onto measurements (Xi, Yi) of two dimensional-coordinates on a photographic image (i). Here Ci is the focal length of the camera, and six evaluation elements (X0i, Y0i, Z0i, ωi, ϕi, κi) represent the coordinates and inclination of the camera projection center).

COLLINEAR CONDITIONS $$Xij \approx Ci(a11i(Xj-X0i)+a12i(Yj-Y0i)+a13i(Zj-Z0i)) -$$
$$(a31i(Xj-X0i)+a32i(Yj-Y0i)+a33i(Zj-Z0i))$$
$$Yij \approx Ci(a21i(Xj-X0i)+a22i(Yj-Y0i)+a23i(Zj-Z0i)) -$$
$$(a31i(Xj-X0i)+a32i(Yj-Y0i)+a33i(Zj-Z0i))$$

On the other hand, when a non-survey camera such as a commercially available digital camera is used, the fact that the non-linear distortion of a photograph is included in a corresponding photographic image should be taken into consideration. The coordinates (x, y) of a photographic image P are represented as below from a survey coordinate system (xc, yc), a photographic coordinate system (xh, yh) and a lens distortion (Δx, Δy). Here, k1, k2, k3, p1 and p2 are coefficients with respect to the lens distortion, and eight evaluation elements (ci, Hhi, Yhi, k1i, k2i, k3i, p1i and p2i are coefficients with respect to the focal length of the camera, the principal point shifts of the camera and the lens distortion.

$$\begin{vmatrix} a11i & a12i & a13i \\ a21i & a22i & a23i \\ a31i & a32i & a33i \end{vmatrix} =$$

$$\begin{vmatrix} \cos\kappa i & -\sin\kappa i & 0 \\ \sin\kappa i & \cos\kappa i & 0 \\ 0 & 0 & 1 \end{vmatrix} \cdot \begin{vmatrix} 1 & 0 & 0 \\ 0 & \cos\omega i & -\sin\omega i \\ 0 & \sin\omega i & \cos\omega i \end{vmatrix} \cdot \begin{vmatrix} \cos\phi i & 0 & \sin\phi i \\ 0 & 1 & 0 \\ -\sin\phi i & 0 & \cos\phi i \end{vmatrix}$$

-continued $$xij = xcij - xhi - \Delta xij$$
$$yij = ycij - yhi - \Delta yij$$
$$\Delta xij = xij(k1irij^2 + k2irij^4 + k3irij^6) + p1i(rij^2 + 2xij^2)2p2ixijyij$$
$$\Delta yij = yij(k1irij^2 + k2irij^4 + k3irij^6) + 2p1ixijyij + 2pi(rij^2 + 2yij^2)$$
$$rij^2 = xij^2 + yij^2$$

In the analytical processing according to the system of the embodiment of the invention, the conditions are formulated for the use of the aforesaid non-survey camera so that the camera lens can be analytically corrected for distortions, etc. For this reason, it is unnecessary for the customer to use a dedicated camera for the purpose of taking digital photographs; commercially available digital cameras can be used, resulting in some consideration reductions of equipment costs.

In conventional photo survey systems, costly analyzers such as drawing-creation analyzers have been used to enable a skilled person to carry out manual matching operations for the points to be analyzed per photograph. With the system according to this embodiment, however, a personal computer is used to subject digital photographic data to image processing whereby the station to be analyzed is extracted per photograph, so that matching for corresponding stations between the respective photographs can be automatically effected. In other words, an image analysis system is used to perform matching for stations in the photographs on the personal computer.

In this embodiment, it is noted that by locating photo survey stations at the area under survey, image processing can be carried out for analysis processing to extract the respective stations in an automated manner.

To be more specific, the stations are detected by image processing from the color densities on the photographic image to automatically determine the relation between thresholds and pixel coordinates or the coordinates (barycentric coordinates) of the stations, as shown in FIG. 17.

For the customer or survey firm, however, it is acceptable to determine iron-reinforcing piles or the features of a structure as the stations on the photographic image, thereby marking the stations by image or manual processing. It is noted that the stations for photo surveying used herein may be provided by fixing reflective boards or blocks by means of anchors, pegs or the like.

Exemplary station positions and photographs obtained for photo surveying are shown and given in FIG. 18. The marks "." stand for the positions of stations, the rectangular frame represents the range where each photographic image is obtained, and the "·-·" indicates information on known length.

It is here noted that the photo survey service system according to this embodiment of the invention is applicable to the computerization of a tunnel. In other words, this photo survey system may be used to measure displacements in the internal space at the time of excavation. More specifically, the system of this embodiment is used to measure displacements in the internal space at the time of excavation for inverse analysis, thereby making it possible to calculate distortions in the ground in the vicinity of the tunnel, the stress of sprayed concrete and the axial force of rock bolts generated. To measure displacements in the internal space of the tunnels and calculate the sectional area to be excavated, etc. using this system, a plurality of photographic images obtained at varied angles and positions in the tunnel during excavation may be used. In this case, however, flash shots of stations with reflective seals put thereon are taken to calculate the three-dimensional coordinates of each station.

It is noted that the aforesaid series of image or analytical processing steps may be performed either by an analyzing computer installed at the site of the photo survey service firm which has received an order for analyzing operations or an analyzing computer installed at the site of an analysis service firm to which the data to be analyzed have been outsourced from the photo survey service firm.

Finally, the results of the image processing and computation processing performed by the analyzing computer, viz., the table indicative of the three-dimensional coordinates of each station at the surveyed area such as one shown in FIG. 18, the CAD data on the surveyed area, etc. are e-mailed from the Internet terminal equipment on the photo survey service firm side to terminal equipment on the customer side. In this way, the results of photo surveying are delivered to the customer.

According to the photo survey service system of the invention, it is possible for the customer to obtain the end outcome of photo surveying through simple administrative work on short lead times yet at low cost. What should be carried out for this purpose on the customer side is only to take photographs of the area to be surveyed using a commercially available digital camera, etc. and send them to the photo survey service firm by means of e-mail, etc. on the Internet. Then, the photo survey service firm may use its own analyzing computer to analyze the photographic data, thereby obtaining the end outcome of photo surveying or the results of analyzing the surveyed area in the form of numerical data or three-dimensional CAD views or the like. Finally, the photo survey service firm e-mails or otherwise delivers such data or views to the customer via the Internet.

What we claim is:

1. A photo survey service system comprising:
    an image information receiving means for receiving image information from a customer's terminal equipment via a telecommunication circuit network, said image information being obtained by taking photographs of an area under survey having a plurality of stations from a plurality of points using a digital camera at a fixed focal length;
    an analysis processing means which uses computation processing to calculate a three-dimensional vector relation of each station from the received image information on the basis of a difference in parallax between both images of adjacent photographing points; and
    an analytical result transmitting means for transmitting information on the calculated three-dimensional vector relation of each station to the customer's terminal equipment via the telecommunication circuit network.

2. A photo survey service system comprising:
    an image information receiving means for receiving image information obtained by taking photographs of an area under survey having a plurality of stations from a plurality of points using a digital camera at a fixed focal length and length information in the area under survey from customer's terminal equipment via a telecommunication circuit network;
    an analysis processing means which uses computation processing to calculate a three-dimensional position of each station from the received image information and the received length information in the area under survey on the basis of a difference in parallax between both images of adjacent photographing points; and
    an analytical result transmitting means for transmitting information on the calculated three-dimensional position of each station to the customer's terminal equipment via the telecommunication circuit network.

3. The photo survey service system according to claim 1 or 2, which further includes a graphic processing means for performing graphic processing on the basis of information concerning the three-dimensional vector relation or position of each station calculated by said analysis processing means, and wherein said analytical result transmitting means is operable to transmit, in addition to the information concerning the calculated three-dimensional vector relation or position of each station, graphic information obtained from said graphic processing means to the customer's terminal equipment via the telecommunication circuit network.

4. The photo survey service system according to claim 1 or 2, further comprising:
    an estimate condition input means for receiving entry of at least information concerning the number of photographs and the total number of stations that are conditions for photo surveying and an output form of photo survey results from terminal equipment for a person or customer gaining access to a generally browsable web site on the Internet;
    an estimate display means for calculating an estimate for photo surveying on the basis of the entered conditions and displaying said estimate on a browsable screen of the terminal equipment for said access person;
    an order intake means for receiving, in a screen, entry of information for identification of said access person including her or his e-mail address and information for confirmation of an order, and for receiving an order under the entered conditions upon entry of said information by the terminal equipment for said person via the Internet; and
    a means for giving instructions on how to photograph whereby, when said order is received, a text file containing information about how to take survey photographs under said entered conditions is e-mailed to the terminal equipment on the access person side via the Internet.

5. The photo survey service system according to claim 1 or 2, further comprising:
    an analyzer database wherein e-mail addresses of analyzers having the necessary analyzing expertise and information concerning their analyzing capabilities are registered;
    an analyzer retrieval means for performing matching for the photographing conditions for an image received by said image information receiving means and the information concerning the analyzing capabilities registered in said database to find the best analyzer from said database;
    an analytical result transmitting means for e-mailing the image information received by said image information receiving means to terminal equipment for the thus found analyzer via the Internet; and
    an analytical result receiving means for receiving, in addition to information on the three-dimensional vector relation and/or position of each station calculated by the analysis processing means on the thus found analyzer side, graphic information subjected to graphic processing by said graphic processing means from the terminal equipment on the thus found analyzer side via the Internet.

* * * * *